Figure 1:
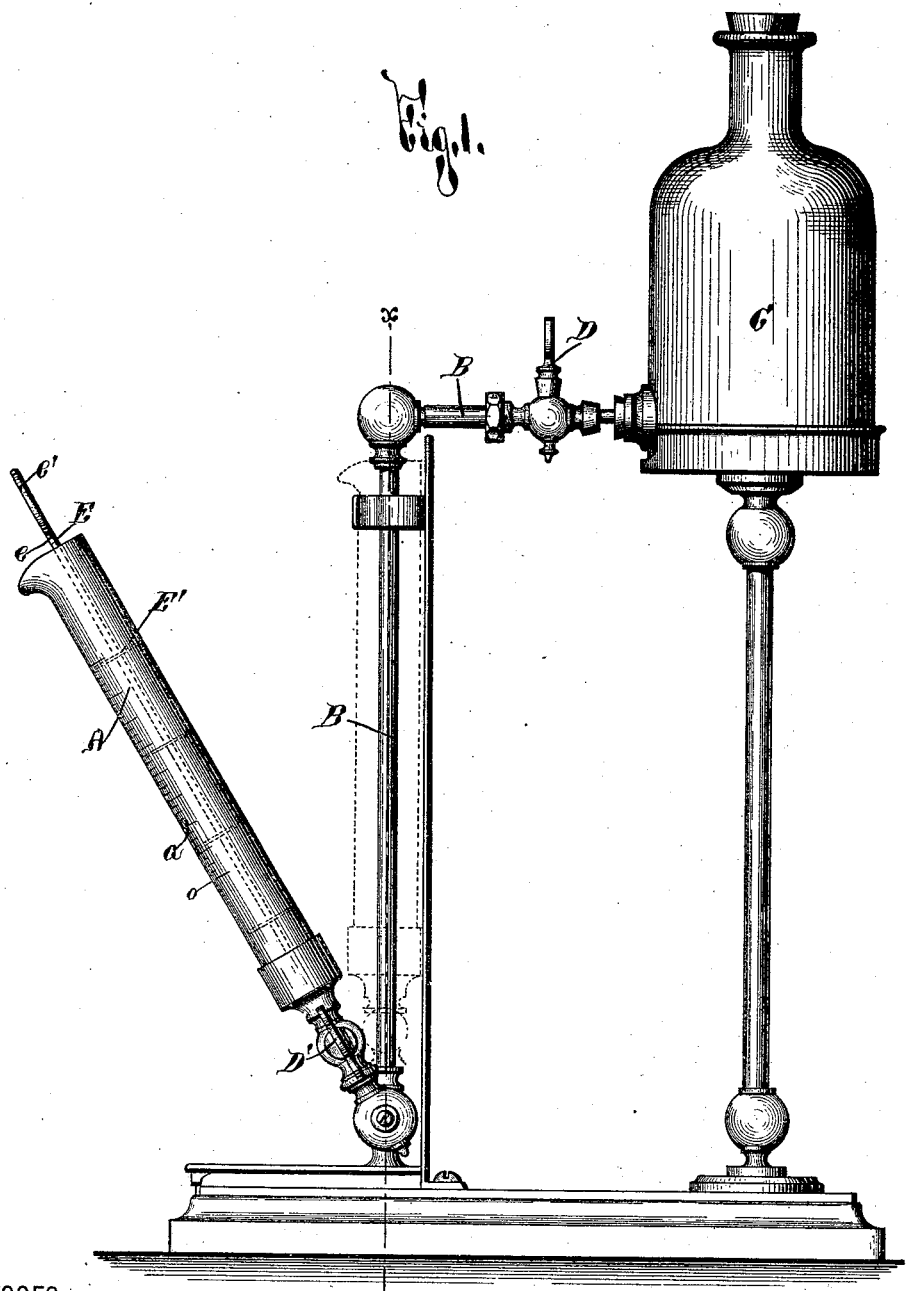

(No Model.) 2 Sheets—Sheet 1.

T. CLEMENT.
PROCESS OF TESTING LIQUIDS.

No. 437,356. Patented Sept. 30, 1890.

WITNESSES:
INVENTOR
Thomas Clement
BY
George W. Hey
ATTORNEY (No Model.) 2 Sheets—Sheet 2.
T. CLEMENT.
PROCESS OF TESTING LIQUIDS.
No. 437,356. Patented Sept. 30, 1890.
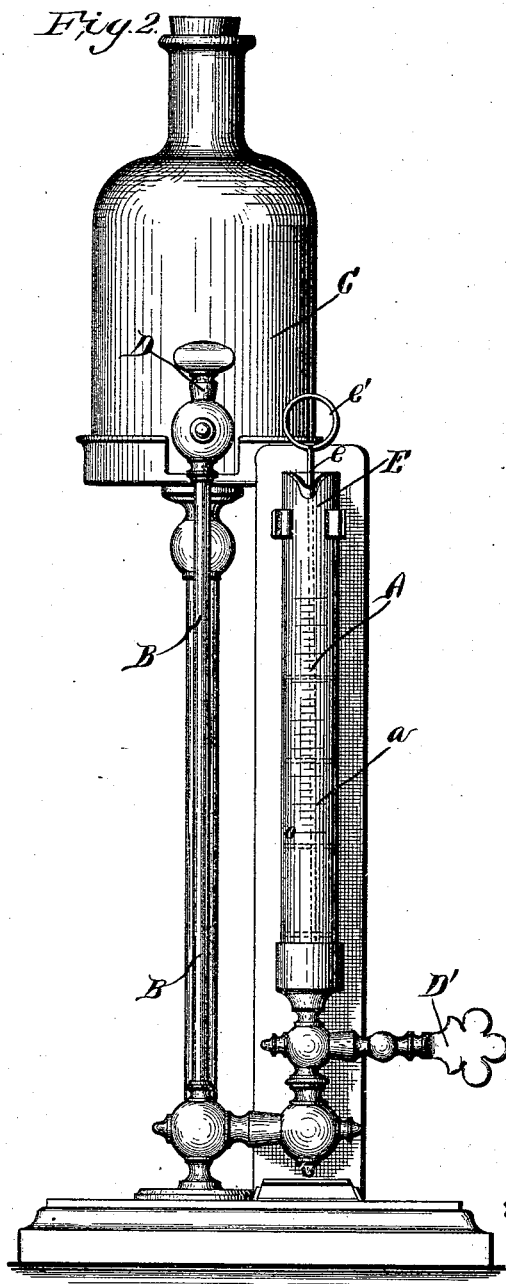
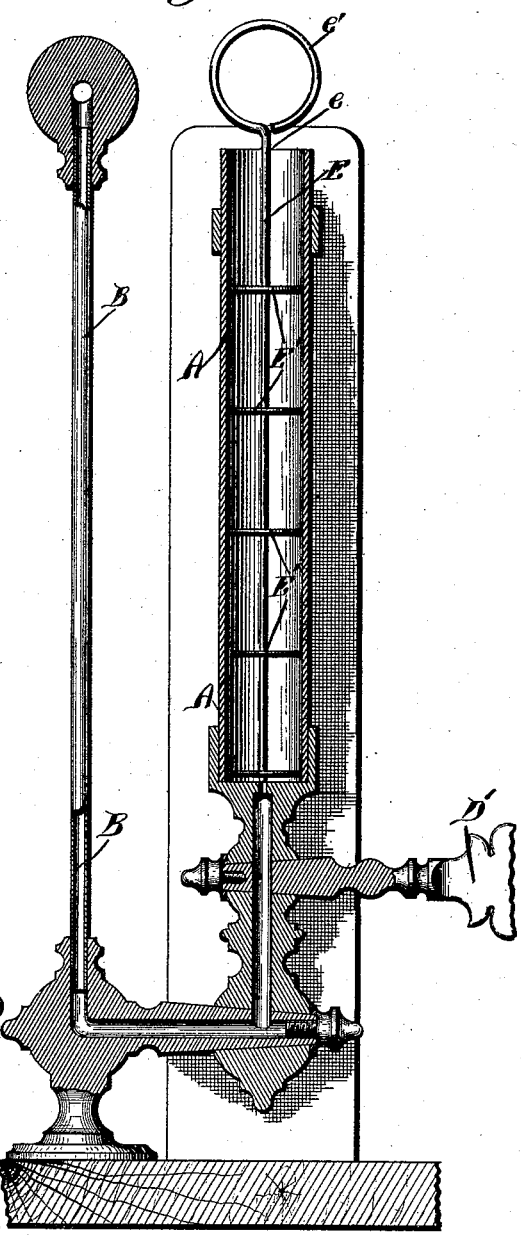
WITNESSES:
INVENTOR
Thomas Clement
BY
George W. Ashley
ATTORNEY

UNITED STATES PATENT OFFICE.

THOMAS CLEMENT, OF GLASGOW, SCOTLAND.

PROCESS OF TESTING LIQUIDS.

SPECIFICATION forming part of Letters Patent No. 437,356, dated September 30, 1890.

Application filed August 26, 1889. Serial No. 321,918. (No model.)

*To all whom it may concern:*

Be it known that I, THOMAS CLEMENT, of Glasgow, in the county of Lanark, Scotland, have invented new and useful Improvements in a Process of Testing Liquids, of which the following, taken in connection with the accompanying drawings, is a full, clear, and exact description.

My invention relates to improvements in the process of ascertaining the amount or strength of one or more of the constituent parts of milk curd, oils, or other materials; and it consists, essentially, in mixing with the said material to be tested a substance, as phenolthaline, which I term an "indicator," and then subjecting said mixture to the chemical action of a substance or neutralizer, as caustic soda, which has a greater affinity for said constituent substance than for the indicator.

It also consists in agitating said mixture during the action of the testing material.

In describing my invention reference is had to the accompanying drawings, forming a part thereof, in which like letters indicate corresponding parts in all the views.

Figure 1 is an elevation of one form of apparatus for carrying out my improved process, the testing-receptacle being shown as slightly tilted to allow of the discharge of the material therefrom. Fig. 2 represents an elevation of the parts illustrated in Fig. 1, taken in a plane at a right angle to that of said figure; and Fig. 3 represents a longitudinal sectional view taken on line *x x*, Fig. 1, with the testing-receptacle in its normal position.

My process, although applicable for testing various substances, is especially designed for testing the acidity of milk curd or whey in the manufacture of cheese.

In the manufacture of cheese a substance termed "rennet" is mixed with the milk to coagulate or thicken the same and to produce the curd, which when pressed or formed produces or forms the cheese. In practice it is usual to heat the milk to a temperature of 80° or 85°, which causes lactic acid to be developed more or less quickly. It is also usual to mix the previous night's milk with the following morning's milk, and this standing of the night's milk causes lactic acid to develop therein and partially ripens said milk before its mixing with the morning's milk. After the milk has been placed in the usual receptacle a desirable amount of rennet is mixed therewith in order to produce coagulation. From the difference in temperature of the weather and other causes and conditions the time necessary for the development of lactic acid greatly varies, and consequently the amount of rennet must also be varied. This arises from the fact that it is not desirable to allow the curd to remain in the whey until the whey becomes too sour. Accordingly, if the milk is tending to too great acidity, more than the ordinary amount of rennet must be used in order to quicken the coagulation of the milk and the ripening of the curd to the desired condition, so that the whey may be drawn off before becoming too acid. On the other hand, if the milk is sweet, then a less than ordinary amount of rennet is added in order to prolong the process and allow the whey to become acid, or, in other words, to allow the desired development of lactic acid.

The determining of the acidity of the milk and the consequent amount of rennet to be added in order to produce the best result has heretofore usually depended upon the taste or smell of the operator, or some other totally inadequate test, which, it will be understood, is necessarily uncertain. By the use of my improved process I take a certain amount of milk and ascertain positively the amount of acid developed therein, and consequently know exactly the desired amount of rennet necessary to be mixed therewith in order to produce the finest quality of cheese.

In order to carry out my process, I prefer to use the apparatus described and claimed in my application for patent of even date herewith. This apparatus is provided with a testing tube or receptacle, into which I place a small amount of the milk to be tested. Opening into the base of this receptacle A is the pipe B, of suitable size, form, and construction, and leading from a desirable reservoir C, which contains a suitable alkali, as caustic soda. Before allowing the passage of the alkali into the receptacle A, I mix with the milk a small amount of a substance which I term an "indicator." Phenolthaline is the preferable form of indicator; but it is evident that I may use any other desirable material which has a less affinity for the alkali than does the acid of the milk, and which, after the neutralization of the lactic acid of the milk when attacked by said alkali, will produce a result that can be readily noticed, such as a change in the color of the milk, as is the case when phenolthaline is used as the indicator. It will thus be understood that the term "indicator" as applied to the phenolthaline or other substance which may be used means that the said substance "indicates," by producing a noticeable result, that the lactic acid of the milk is neutralized, which result in the case of the phenolthaline, as presently stated, is a pink tinge given to the milk and due to the change in the color of the phenolthaline when attacked by the alkali.

The preferable alkali or neutralizer for the milk consists of a normal solution of caustic soda; but it is also evident that other alkalies may be used, if desirable. The phenolthaline and milk are in sufficient quantity within the receptacle A, so as to rise to a point marked zero, above which there are a number of graduations $a$. By opening the air-inlet into the receptacle C and opening the stop-cocks D D' the caustic soda is forced to enter the receptacle A and cause the height of the material to constantly rise and the lactic acid to become neutralized. After the entire neutralization of the lactic acid by the caustic soda the phenolthaline in the testing-tube is then attacked by the excess of the acid and turns the mixture a pinkish tinge, which is readily noticed by the operator and instantly informs him that the lactic acid is neutralized by the alkali, whereupon the flow of the acid is shut off by the stop-cocks D D'. The operator then notices the number of degrees that the height of the material has raised, which degrees are of such a character that he can immediately determine the amount of alkali which has entered the receptacle A, and thus determine the amount of acid in the milk.

It will be readily understood that the reason the indicator phenolthaline is not affected at first by the incoming alkali is that the said alkali has a greater affinity for the lactic acid of the milk than for the phenolthaline, and consequently as long as there is any of said acid unneutralized by the alkali the phenolthaline is not affected; but immediately upon the neutralization of the lactic acid the excess of the alkali attacks the indicator and changes the color of the mixture, as previously stated.

During the admission of the alkali it is advisable to continually agitate or stir the milk in order to cause the alkali to neutralize the entire amount of the lactic acid in said testing-tube. To allow this I provide an agitator E, the preferable form of which consists of a rod $e$, having a number of perforated disks E' provided thereon, and a ring or other means $e'$ at the upper end thereof, whereby the same may be readily engaged.

It will thus be understood that by my improved process a cheese-maker can accurately determine at any stage in the operation of manufacture the exact amount of acid in the milk before the rennet is added, or in the whey, which is a feature of great advantage.

It is sometimes the case that the whey is drawn off when perfectly sweet, and the curd is then allowed to remain in the vat without salting, keeping it covered up, so that the lactic acid will develop in the curd itself. The acidometer can then be used to determine the degree of acidity in said curd, and when the desired condition is reached the curd can then be salted and put in the press.

It will be understood that instead of caustic soda and phenolthaline, other alkalies and indicators may be used in carrying out my process, which may also be used to test other materials besides milk. If the material to be tested should contain an alkali the amount of which it is necessary or desirable to know, the receptacle C is then filled with an acid which operates in exactly the same manner as the alkali used in testing milk and is no departure from my process.

This acidometer is also useful in butter-making, for the cream should be churned when it is ripened to just the right degree to produce the finest flavor and largest yield. Sometimes it is desired to make sweet-cream butter, and when this is the case then the cream must be churned while it is perfectly sweet. By the use of the acidometer it can be determined whether the cream is sweet or whether it is acid, and, if the latter, then to what extent. By the use of this instrument, therefore, the butter-maker can watch the cream, and by testing can churn it when just the right condition is reached to produce the best product, thus enabling the operator to tell the precise moment at which said churning should begin.

This acidometer is also useful in determining the amount of acid contained in butter, lard, oils, and many other substances. This is a feature of great advantage, since the value of these articles depends to a great extent upon their sweetness, and the deteriorating presence of acid can be immediately determined.

My acidometer can also be used for testing articles which are chemically termed "salts," since by placing a neutralizer consisting of either an acid or an alkali stronger than the acid or alkali then constituting a part of said substance the said neutralizer will ascertain positively the amount of acid or alkali composing said material.

It will be understood that I do not limit my invention to the described order of the steps nor to the preferable kind of neutralizer or indicator. The indicator, if desired, instead of changing the color of the material to be tested, might bring about some other chemical action which would readily be noticed by the operator and would inform him that the acid of said material had been neutralized.

Having thus fully described my invention, what I claim as new, and desire to secure by Letters Patent, is—

1. The herein-described process of ascertaining the amount of a constituent element of any desired material by means of a substance or neutralizer having a chemical affinity for said element, the same consisting in mixing with said material a substance or indicator having a less chemical affinity for said neutralizer than has the said constituent element, then subjecting said mixture to an amount of said neutralizer in chemical excess of said constituent element, whereby after the neutralization of said constituent element the indicator is attacked by said excess and produces a noticeable result, substantially as set forth.

2. The herein-described process of ascertaining the amount of a constituent element of any desired material by means of a substance or neutralizer having a chemical affinity for said element, the same consisting in mixing with said material a substance or indicator having a less chemical affinity for the said neutralizer than has the said constituent element, then subjecting said mixture to an amount of said neutralizer in chemical excess of said constituent element and agitating said mixture, whereby the said neutralizer permeates the entire mixture, and after the neutralization of said constituent element attacks the indicator by said chemical excess and produces a noticeable result, substantially as described.

3. The herein-described process of ascertaining the acidity of milk, &c., by means of a neutralizer of the lactic acid of said milk, the same consisting in mixing with the milk a substance or indicator having a less affinity for said neutralizer than said lactic acid, then subjecting said mixture to an amount of said neutralizer in chemical excess of the lactic acid, whereby after the neutralization of said acid the indicator is attacked by the said excess and produces a noticeable result, substantially as specified.

4. The herein-described process of ascertaining the acidity of milk by means of an alkali, the same consisting in mixing phenolthaline with the milk, then subjecting the mixture to the action of an amount of said alkali in chemical excess of the lactic acid of the milk, whereby when the said acid is neutralized the phenolthaline is attacked and changes the color of the milk, substantially as described.

In testimony whereof I have hereunto signed my name, in the presence of two attesting witnesses, at Syracuse, in the county of Onondaga, in the State of New York, this 6th day of June, 1889.

THOMAS CLEMENT.

Witnesses:
CLARK H. NORTON,
A. E. PARSONS.